United States Patent
Bayer et al.

[11] Patent Number: 6,062,626
[45] Date of Patent: May 16, 2000

[54] CENTER CONSOLE AREA FOR A MOTOR VEHICLE

[75] Inventors: Helmut Bayer, Wildberg; Wolfgang Henseler, Tuebingen; Ulrich Schick, Nagold-Vollmaringen, all of Germany

[73] Assignee: MC Micro Compact Car AG, Biel, Sweden

[21] Appl. No.: 09/058,250

[22] Filed: Apr. 10, 1998

[30] Foreign Application Priority Data

Apr. 16, 1997 [DE] Germany .............................. 197 15 873

[51] Int. Cl.[7] .................................................. B60K 37/00
[52] U.S. Cl. ................................ 296/72; 296/70; 296/194
[58] Field of Search ............................. 296/70, 72, 191, 296/194; 180/90

[56] References Cited

U.S. PATENT DOCUMENTS

| | | |
|---|---|---|
| 4,597,461 | 7/1986 | Kochy et al. ........................ 296/72 X |
| 5,387,023 | 2/1995 | Deneau ................................... 296/72 |
| 5,492,388 | 2/1996 | Kawaski . |

FOREIGN PATENT DOCUMENTS

| | | |
|---|---|---|
| 33 15 646 C2 | 5/1985 | Germany . |
| 004337467 | 5/1994 | Germany ............................... 296/72 |
| 43 37 467 A1 | 9/1994 | Germany . |

Primary Examiner—Joseph D. Pape
Attorney, Agent, or Firm—Evenson McKeown Edwards & Lenahan P.L.L.C.

[57] ABSTRACT

In a center console area for a passenger motor vehicle, the compensating wedge is disposed by a bearing arrangement on the assigned holding section of the center console crossmember. Thereby, the compensating wedge can be changed in a forcibly guided manner from a mounting position into an operative position which compensates tolerances between the center console crossmember and the support columns. A stop fixes the compensating wedge in its mounting position, and, in particular, form-lockingly acting fixing devices are assigned to the compensating wedge for securing the compensating wedge in its operative position.

16 Claims, 2 Drawing Sheets

CENTER CONSOLE AREA FOR A MOTOR VEHICLE

SPECIFICATION

| INVENTION | CENTER CONSOLE AREA FOR A MOTOR VEHICLE |
|---|---|
| INVENTOR: | Helmut BAYER |
| Citizenship: | Germany |
| Post Office Address/ | Ginsterweg 11 |
| | 72218 Wildberg |
| Residence: | Germany |
| INVENTOR: | Wolfgang HENSELER |
| Citizenship: | Germany |
| Post Office Address/ | Wolfgang-Stock-Strasse 19 |
| | 72076 Tuebingen |
| Residence: | Germany |
| INVENTOR: | Ulrich SCHICK |
| Citizenship: | Germany |
| Post Office Address/ | Schwarzwaldstrasse 15 |
| | 72202 Nagold-Vollmaringen |
| Residence: | Germany |
| ATTORNEYS: | EVENSON, McKEOWN, EDWARDS & LENAHAN, P.L.L.C. |
| | Suite 700 |
| | 1200 G Street, N.W |
| | Washington, D.C. 20005-3814 |
| | Phone No.: (202) 628-8800 |
| | Facsimile No.: (202) 628-8844 |

BACKGROUND AND SUMMARY OF THE INVENTION

This application claims the priority of German application 197 15 873.0, filed Apr. 16, 1997, the disclosure of which is expressly incorporated by reference herein.

The present invention relates to a center console area for a motor vehicle, and more particularly to a center console area having a center console crossmember which can be fixed on holding sections in the area of its opposite front ends with the interposition of at least one compensating wedge on two lateral support columns of a body supporting structure of the motor vehicle, and to which a steering system is assigned on a driver side.

A center console area is shown DE 43 37 467 A1. In this center console area, a complete center console for a vehicle interior of a motor vehicle, preferably a passenger car, can be premounted on a center console crossmember extending along the vehicle width. For mounting the center console premounted on the center console crossmember in the passenger compartment, the center console is placed between two A-columns serving as support columns of the vehicle body supporting structure, and subsequently the center console crossmember is fixed by holding sections provided in the area of its opposite front ends by way of fastening screws at fastening points of the support columns. In order to compensate tolerances between the width of the center console and of the center console crossmember as well as the spacing between opposite support columns, one compensating wedge respectively is assigned to the two opposite holding sections of the center console crossmember, which compensating wedge is in each case held in an upper mounting position by means of a securing element.

As the result of the removal of each securing element in this known arrangement, the two compensating wedges slide automatically downward because of their own weight until they have filled in the gap which in each case remains between the assigned support column and the holding section of the center console crossmember and are wedged between these. The fastening screws are now tightened so that a secure connection is established between the center console crossmember and the support columns. The removal of the securing elements with the simultaneous alignment of the center console crossmember with respect to the support columns, however, requires certain additional mounting expenditures. If, in addition, the fastening screws not be completely tightened, the compensating wedges between the support columns and the center console crossmember may become loose particularly in the case of vibrations of the vehicle and eliminates the close connection between the center console crossmember and the support columns.

An object of the present invention to provide a center console area which, while reducing the mounting expenditures, ensures a secure connection between the center console crossmember and the support columns.

This object has been achieved in accordance with the present invention by providing that the compensating wedge is disposed by way of a bearing arrangement on the assigned holding section of the center console crossmember. The bearing arrangement thereby allows the compensating wedge to be changed in a forcibly guided manner from a mounting position into an operative position to compensate tolerances between the center console crossmember and the support columns. The bearing arrangement has a stop for fixing the compensating wedge in its mounting position, and fixing devices which act, in particular, in a form-locking manner, are assigned to the compensating wedge for securing the compensating wedge in its operative position.

The bearing arrangement including the stop according to the invention makes possible keeping the compensating wedge, on one hand, fixed in its mounting position and nevertheless, on the other hand, without the additional releasing of the securing element directly out of this mounting position, achieve a changing of the compensating wedge into the operative position. The forced guidance of the compensating wedge between the mounting position and the operative position can take place either by a rotational or by a translational movement.

The fixing devices ensure that the compensating wedge will also be held securely in its operative position when no fixedly tightened connection exists between the support columns and the center console crossmember. In the past, fixing devices were not provided for securing the compensating wedge in its operative position. Rather, the fixing of the compensating wedge in its operative position took place exclusively by the force-locking contact on the support column and on the holding section of the center console crossmember because of the tightened screwed connections.

In a particularly advantageous way, the fixing devices of the present invention have a form-locking effect. The direction of the form closure relates to the movement direction of the compensating wedge relative to the holding section. Thus, in contrast to the conventional approach in which the fixing of the compensating wedge in its operative position took place exclusively by the force-locking contact on the support column and on the center console crossmember, as the result of the form-locking effect, also independently of a possibly non-existing force-locking by means of the fastening screws, a secure positioning of the compensating wedge in its operative position is ensured with the present invention.

The form-locking effect of the fixing devices is advantageous particularly with a translationally movable compensating wedge. With a rotationally movable compensating wedge, a fixing of the compensating wedge in its operative function can be achieved by a self-locking thread of the bearing arrangement coaxially to the axis of rotation.

According to a further embodiment of the present invention, the center console crossmember, in the area of the driver side, is fastened directly to the assigned support column. A compensating wedge is provided between the opposite holding section and the corresponding support column. As a result, only an individual compensating wedge is required, thereby considerably reducing the mounting expenditures. Because of the direct fastening of the center console crossmember to the support column adjacent to the steering system and therefore also to the steering column as contemplated by the present invention, a considerable shortening of the tolerance chain is achieved between the support column and the steering system. Thus, a maintenance of narrow tolerances is achieved with respect to the position of the steering system relative to the vehicle body supporting structure. By providing only a single compensating wedge, the number of parts for mounting the center console on the motor vehicle body supporting structure is also reduced. The compensating wedge may configured accordingly.

According to a further aspect of the present invention, guide surfaces for the rotational or translational forced guidance of the compensating wedge between its mounting position and its operative position are assigned to the compensating wedge and the corresponding holding section. As the result, a particularly simple change of the compensating wedge into the operative position or the mounting position is permitted.

Yet another feature of the present invention assigns at least one oblong hole section to the compensating wedge in the area of the fastening points between the support column and the center console crossmember. The oblong hole section extends corresponding to the compensating path and has a width which is smaller than a thread diameter of at least one assigned fastening screw of the fastening points. The fastening screw or screws is/are self-grooving. Since the oblong hole section has a smaller width than the thread diameter of the fastening screw(s), during the screwing-in, the fastening screw(s) cuts into the edges of the at least one oblong hole section. Thereby, a form closure is achieved in the direction of the compensating path and therefore in the moving direction of the compensating wedge. The form closure holds the compensating wedge in its operative position.

A further feature of the present invention involves a translationally guided compensating wedge. Suspension devices serving as a stop are provided on the compensating wedge and on the pertaining holding section of the center console crossmember for the mounting position of the compensating wedge. The compensating wedge can be displaced relative to the holding section from its mounting position upwards relative to the vertical direction of the vehicle. This arrangement is a particularly simple and operationally reliable further embodiment because the compensating wedge need only be suspended on the pertaining holding section of the center panel crossmember. Because the compensating wedge is pushed upward, it is automatically disengaged from the corresponding suspension elements on the holding section of the center console crossmember so that it can be changed without any additional manipulations directly from the mounting position into the operative position. In particular, suspension hooks constituting the suspension elements are provided on the compensating wedge, and pertaining suspension noses or pins are provided on the holding section of the center panel crossmember.

In a further aspect of the present invention, with respect to a translationally forcibly guided compensating wedge, lateral guides are assigned to the corresponding oblique contact surfaces of the compensating wedge and of the holding section on opposite edge areas. This is another particularly simple and operationally reliable solution, particularly since the lateral guides can be shaped in one piece onto the compensating wedge or onto the holding section of the center console crossmember.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
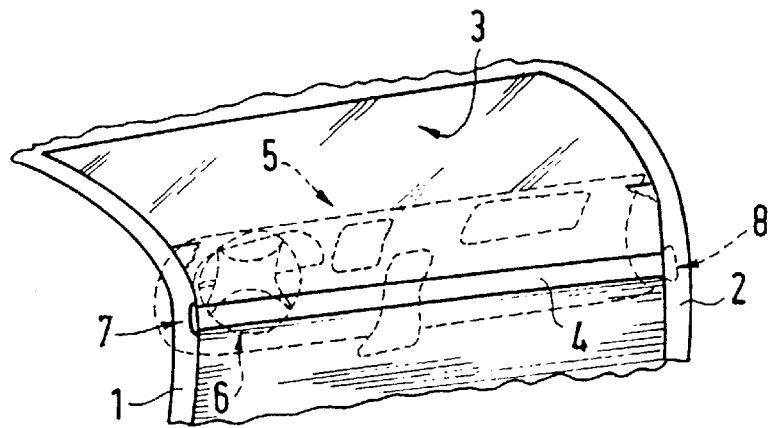
FIG. 1 is a schematic perspective view of an embodiment of a center console area according to the present invention in which the center console crossmember is arranged between two A-columns of a passenger vehicle body supporting structure, which A-columns are used as support columns.

A passenger car has a self-supporting vehicle body supporting structure which, in a frontal area of a passenger compartment, is provided with a support column 1 which is on the left, as viewed in the driving direction, and with a support column 2 which is on the right, as also viewed in the driving direction. The support columns 1 and 2 are formed by A-columns of the vehicle body supporting structure and bound or frame a windshield 3 of the passenger compartment on both sides. Below the windshield 3, a center console area 5 is provided, with the individual center console components being fixed on a center console crossmember 4. The center console crossmember 4 extends horizontally along the width of the passenger compartment and, on its opposite front ends, is fixed on the support column 1 on one side and on the support column 2 on the other side. For fixing the center panel crossmember 4 on the two support columns 1, 2, the center panel crossmember 4 has a left holding section on one side and a right holding section on the other side which are each fixed by fastening screws on the assigned support columns 1, 2. In the illustrated embodiment, the center panel crossmember 4 is produced as a one-piece component made of a light-metal material, particularly of magnesium. The holding sections 7, 8 are shaped in one piece on the center panel crossmember 4.

The center console crossmember 4 also carries the center-console-side portion of a steering system 6, particularly a steering column as well as a steering wheel. The center-console-side portion of the steering system 6 is arranged on a driver side of the passenger compartment and, in the illustrated embodiment, is adjacent to the support column 1 which is on the left in the driving direction. The center console crossmember 4 is fastened by its holding section 7 directly to the support column 1 adjacent to the steering system 6. Thereby, the stiff center console crossmember 4 achieves a direct, low-tolerance assignment of the steering system 6 to the vehicle body supporting structure. Because tolerances occur with respect to the distance between the two support columns 1, 2 and the length of the center console crossmember 4 extending along the width of the passenger compartment, the holding section 8 of center console crossmember which is on the right in the driving direction is fastened on the opposite support column 2 with the interposition of a compensating wedge 9 which will be described below.

According to the position of the contact surfaces of the holding section 8, of the compensating wedge 9 and of the support column 2 in the geometric space, tolerances can therefore be compensated in the transverse direction of the vehicle, in the vertical direction of the vehicle and in the longitudinal direction of the vehicle. For this purpose, the holding section 8, advantageously analogous to the linking of the opposite holding section 7 to the opposite support column 1, is either aligned to be bent or is an aligned extension of the center console crossmember 4.

Figure 2:
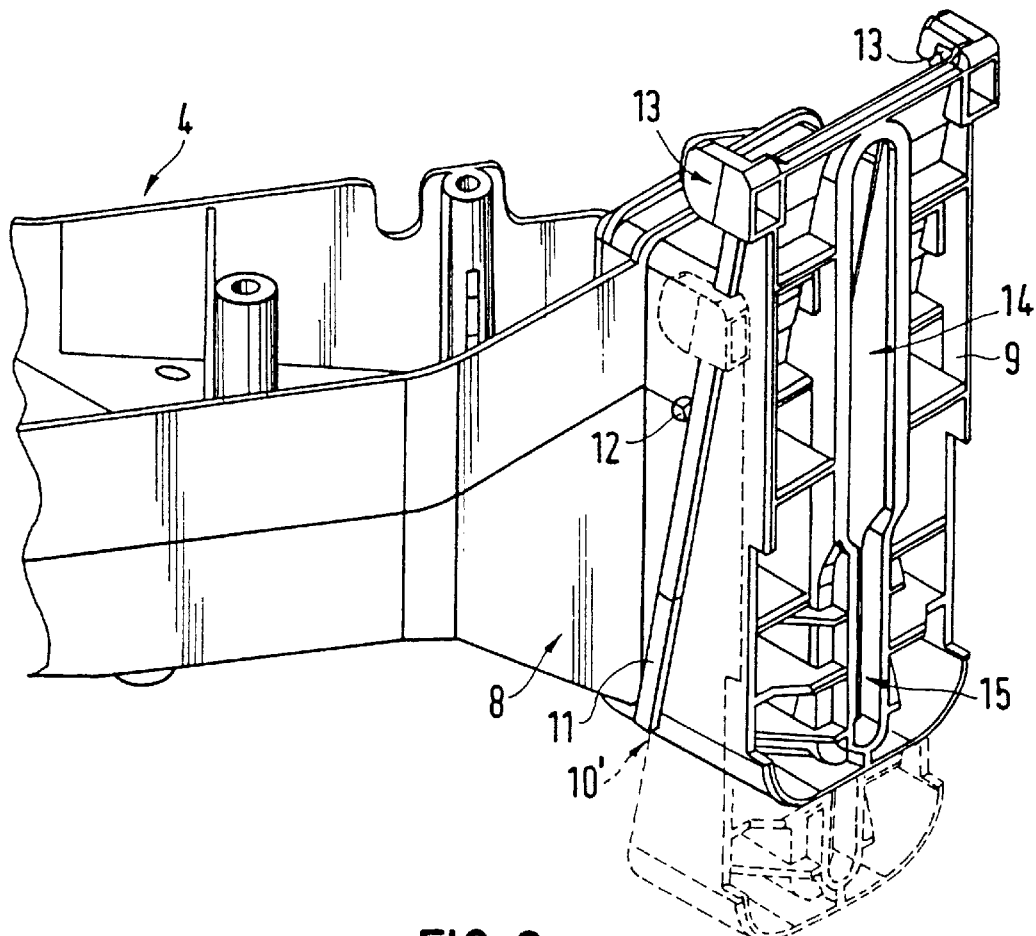
FIG. 2 is a perspective enlarged representation of a lateral holding section of the center console crossmember according to FIG. 1, with a compensating wedge being assigned to its oblique contact plane.
Figure 3:
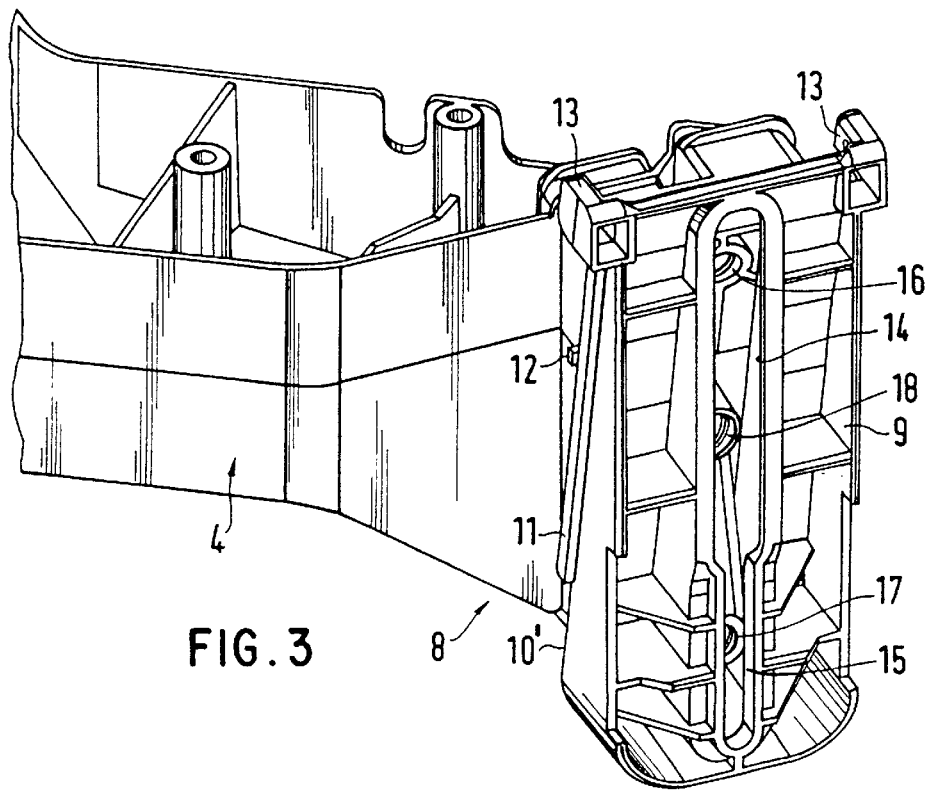
FIG. 3 is another perspective representation of the holding section with the compensating wedge according to FIG. 2 but with a different position of the compensating wedge.
Figure 4:
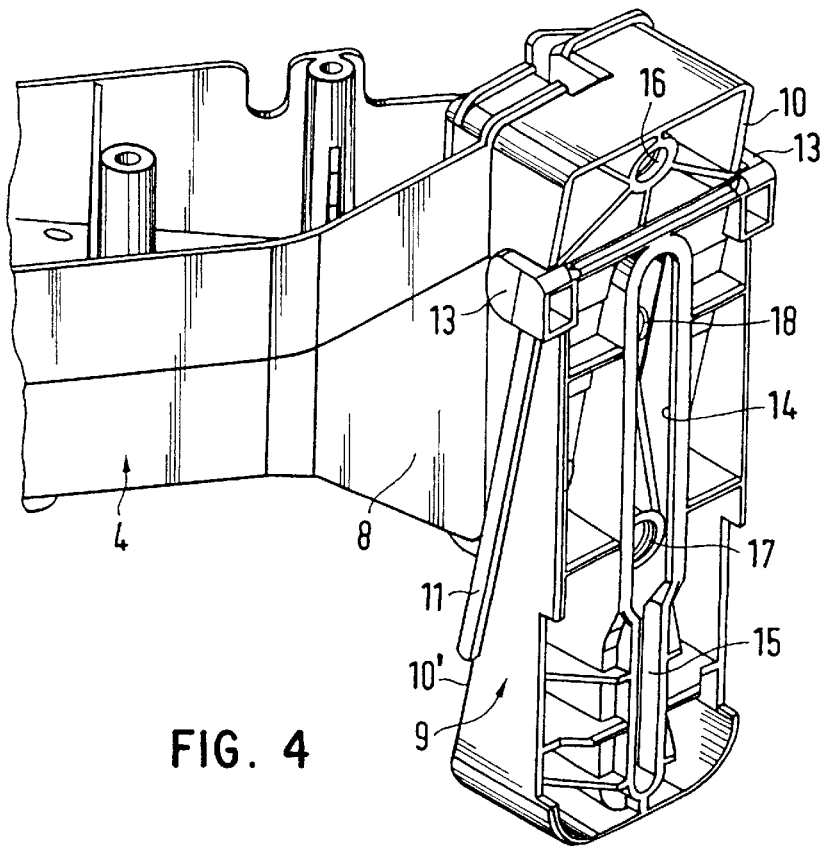
FIG. 4 is a perspective representation of the holding section of the center console crossmember of FIGS. 2 and 3 but in which the compensating wedge is in a mounting position.

According to FIGS. 2 to 4, the holding section 8 has a contact surface 10 sloped as an oblique plane which extends in the upward direction diagonally to the outside. The compensating wedge 9, which is also configured as a one-piece light-metal component, particularly as a magnesium component, has a corresponding contact surface 10' which is adapted such to the contact surface 10 of the holding section 8 that the corresponding contact surfaces 10' can slide flatly along one another. FIG. 3 illustrates a zero position of the tolerance positions from which the tolerance wedge 9 according to FIG. 2 can take up its upper and its lower tolerance end position. FIG. 4 shows the suspension position and therefore the mounting position of the compensating wedge 9.

The wedge shape of the compensating wedge 9 is configured such that the translational displacement of the compensating wedge 9 along the contact surface 10' results in an opposite face of the compensating wedge 9 which extends parallel to the screw-on surface of the support column 2. The contact surface 10' of the compensating wedge 9 is provided on its opposite sides with lateral guides 11 which are shaped on in a rib-like manner and which cause a translational forced displacement of the compensating wedge 9 relative to the holding section 8.

Three fastening domes 16, 17, 18 are distributed along the height of the holding section 8 at a distance above one another and in a common vertical alignment with respect to one another. The fastening domes 16, 17, 18 are provided with receiving bores for receiving self-grooving fastening screws which are screwed from the support column 2 for the fastening of the holding section 8 on the support column 2 into these receiving devices. At the level of the fastening domes 16, 17, 18, the compensating wedge 9 is provided with a longitudinal slot in the form of an oblong hole which is divided into an upper oblong hole section 14 and a lower oblong hole section 15. The upper oblong hole section 14 has a larger width than the oblong hole section 15 to form a necked-down portion therebetween The width of the upper oblong hole section 14 is larger than the outside thread diameter of the fastening screws. In contrast, the width of the lower oblong hole section 15 is smaller than the outside diameter of the threads of these fastening screws. The length of the lower oblong hole section 15 corresponds at least to the maximal displacement path of the compensating wedge 9 relative to the holding section 8, as illustrated in FIG. 2 by way of the lower tolerance position shown by broken lines and the upper tolerance position shown by solid lines.

Therefore, as soon as the pertaining fastening screw is screwed into the receiving device of the lower fastening dome 17 of the holding section 8, the fastening screw simultaneously cuts into the edge of the lower oblong hole section 15. Thereby, a form-locking securing of the compensating wedge 9 is achieved in its respective position relative to the holding section 8. Inasmuch as the compensating wedge 9 is held by the lateral guides 11, which together with the contact surfaces 10 are used as guide surfaces, on the opposite sides of the contact surface 10 in addition in a linearly slidably movable manner relative to the holding section 8, the device forces of the fastening screw assure that no tilting-away of the compensating wedge 9 will occur and that the compensating wedge 9 remains securely in its position.

In order to hold the compensating wedge 9 securely on the holding section 8 of the center console crossmember 4 so it cannot be lost, each of two nose-shaped suspension pins 12 project laterally to the outside and are held on the holding section 8 on two opposite sides. Two pertaining suspension hooks 13 which are shaped in one piece to the compensating wedge 9 are assigned to the suspension pin 12 on the compensating wedge 9. In its mounting position, in which the compensating wedge 9 is held only on the center console crossmember 4 without, however, being connected with the support column 2, the compensating wedge 9 is held securely positioned on the suspension pin 12 because of its own weight and the form-locking securing of the suspension hooks 13. Because the suspension hooks 13 are open in the downward direction, the compensating wedge 9 can be released from this mounting position without any additional manipulations by a simple upward displacement.

For the mounting of the center console crossmember 4 on the support column 2, the compensating wedge 9 is therefore, after the fixing of the center console crossmember 4 on the opposite support column 1, pushed upward in a simple manner to such an extent that the remaining gap between the support column 2 and the holding section 8 of the center console crossmember 4 is filled in. In this position, two fastening screws are first screwed into the two upper fastening domes 16, 18. By the additional screwing of the lower fastening screw into the fastening dome 17, the securing of the position of the compensating wedge 9 is achieved relative to the holding section because of the thread grooving into the edges of the lower oblong hole section 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having two lateral support columns and a center console area, the center console area comprising a center console crossmember having opposite front ends configured with holding sections, at least one compensating wedge interposable between each of the holding sections and the two lateral support columns, and a bearing arrangement on each of the associated holding sections to mount the center console crossmember at the at least one compensating wedge in a mounting position such that the at least one compensating wedge is changeably interposed in a forcibly guided manner from the mounting position into an operative position along a compensating path which compensates tolerances between the center console crossmember and the two lateral support columns, wherein the bearing arrangement has a stop for fixing the at least one compensating wedge in the mounting position, and the at least one compensating wedge includes form-lockingly acting fixing devices for securing the at least one compensating wedge in the operative position.

2. The motor vehicle according to claim 1, wherein the one of the holding sections of the center console crossmember is operatively fastened in a driver side area directly to a respective one of the two lateral support columns, and the at least one compensating wedge is operatively arranged between another of the holding sections and the other of the two lateral support columns.

3. The motor vehicle according to claim 1, wherein the at least one compensating wedge and an associated one of holding sections of the center console crossmember have guide surfaces for the rotational or translational forced guidance thereof between the mounting position and the operative position of the at least one compensating wedge.

4. The motor vehicle according to claim 3, wherein the one of the holding sections of the center console crossmember is operatively fastened in a driver side area directly to a respective one of the two lateral support columns, and the at least one compensating wedge is operatively arranged between another of the holding sections and the other of the two lateral support columns.

5. The motor vehicle according to claim 1, wherein the form-lockingly acting fixing devices comprise at least one oblong hole section extending along the compensating path to define an area of fastening points between the two lateral support columns and the center console crossmember, with the width of the at least one oblong hole section is smaller than a thread diameter of at least one associatable fastening screw having a self-threading configuration.

6. The motor vehicle according to claim 5, wherein the one of the holding sections of the center console crossmember is operatively fastened in a driver side area directly to a respective one of the two lateral support columns, and the at least one compensating wedge is operatively arranged between another of the holding sections and the other of the two lateral support columns.

7. The motor vehicle according to claim 6, wherein the at least one compensating wedge and an associated holding section of the center console crossmember have guide surfaces for the rotational or translational forced guidance thereof between the mounting position and the operative position of the at least one compensating wedge.

8. The motor vehicle according to claim 1, wherein the at least one compensating wedge is configured to be translationally forcibly guided, and suspension elements, configured to act as a stop for the mounting position of the compensating wedge are provided on the at least one compensating wedge and the associated holding section of the center console crossmember, the at least one compensating wedge is operatively arranged to be displaceable relative to the holding section from the mounting position thereof upwards in a direction relative to a vertical direction of the motor vehicle.

9. The motor vehicle according to claim 8, wherein the one of the holding sections of the center console crossmember is operatively fastened in a driver side area directly to a respective one of the two lateral support columns, and the at least one compensating wedge is operatively arranged between another of the holding sections and the other of the two lateral support columns.

10. The motor vehicle according to claim 9, wherein the at least one compensating wedge and an associated one of holding sections of the center console crossmember have guide surfaces for the rotational or translational forced guidance thereof between the mounting position and the operative position of the at least one compensating wedge.

11. The motor vehicle according to claim 10, wherein the form-lockingly acting fixing devices comprise at least one oblong hole section extending along the compensating path to define an area of fastening points between the two lateral support columns and the center console crossmember, with the width of the at least one oblong hole section being smaller than a thread diameter of at least one associatable fastening screw having a self-threading configuration.

12. The motor vehicle according to claim 3, wherein the at least one compensating wedge is configured with oblique contact surfaces to be translationally forcibly guided, and lateral guides are operatively arranged between the corresponding oblique contact surfaces of the at least one compensating wedge and the associated holding section on opposite edge areas thereof.

13. The motor vehicle according to claim 12, wherein the one of the holding sections of the center console crossmember is operatively fastened in a driver side area directly to a respective one of the two lateral support columns, and the at least one compensating wedge is operatively arranged between another of the holding sections and the other of the two lateral support columns.

14. The motor vehicle according to claim 13, wherein the at least one compensating wedge and an associated one of holding sections of the center console crossmember have guide surfaces for the rotational or translational forced guidance thereof between the mounting position and the operative position of the at least one compensating wedge.

15. The motor vehicle according to claim 14, wherein the form-lockingly acting fixing devices comprise at least one oblong hole section extending along the compensating path to define an area of fastening points between the two lateral support columns and the center console crossmember, with the width of the at least one oblong hole section is smaller than a thread diameter of at least one associatable fastening screw having a self-threading configuration.

16. The center console area according to claim 15, wherein the at least one compensating wedge is configured to be translationally forcibly guided, and suspension elements, configured to act as a stop for the mounting position of the compensating wedge are provided on the at least one compensating wedge, and the associated holding section of the center console crossmember, with the at least one compensating wedge being operatively arranged to be displaceable relative to the holding section from the mounting position thereof upwards in a direction relative to a vertical direction of the motor vehicle.

* * * * *